UNITED STATES PATENT OFFICE.

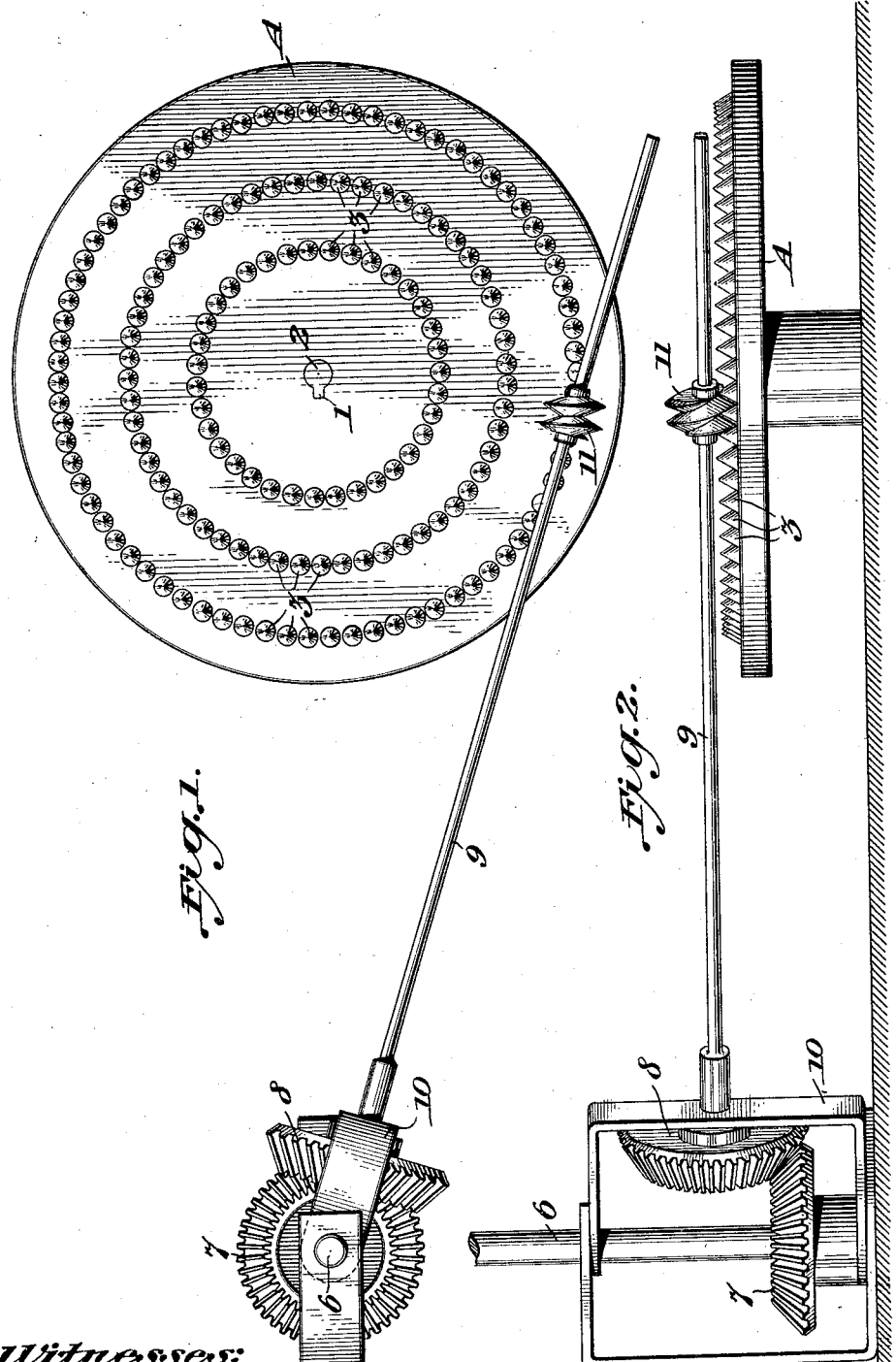

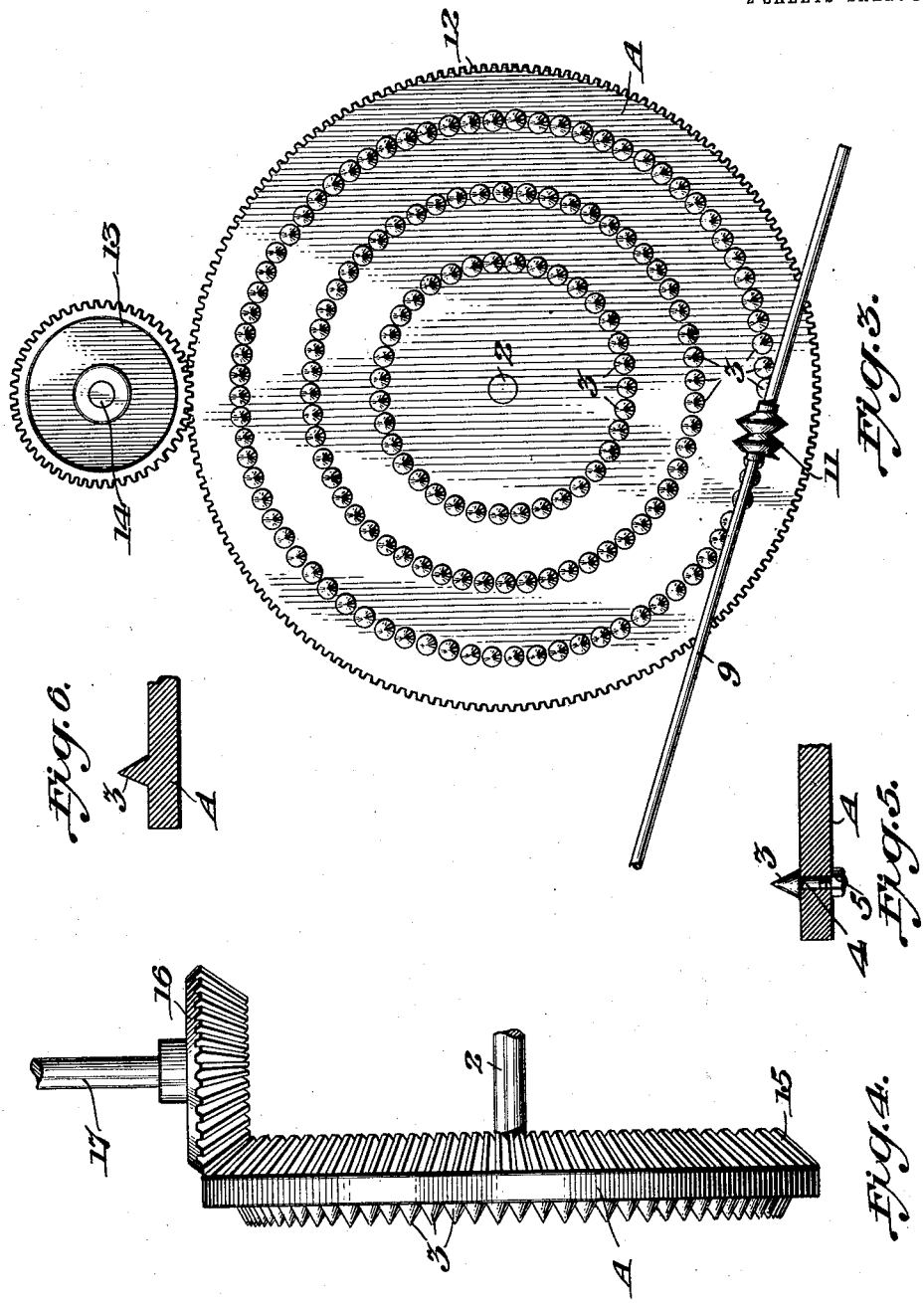

GEORGE ZINK, OF WAYNESBORO, PENNSYLVANIA.

VARIABLE-SPEED-TRANSMISSION GEARING.

1,121,442.  Specification of Letters Patent.  Patented Dec. 15, 1914.

Application filed February 28, 1914. Serial No. 821,672.

*To all whom it may concern:*

Be it known that I, GEORGE ZINK, a citizen of the United States, residing at Waynesboro, in the county of Franklin and State of Pennsylvania, have invented certain new and useful Improvements in Variable-Speed-Transmission Gearing, of which the following is a specification.

This invention relates to an improvement in variable speed transmission gearing, and the object is to provide means whereby the speed of the driven member can be increased at the will of the operator, and it is only necessary to bring the driving member to a neutral position, so that the driven member can be brought to a stop before reversing the driven member.

This invention relates more particularly to that class of invention wherein a disk is provided with a plurality of pins which are engaged by a worm for transmitting rotary movement to the disk, and one of the objects of this invention is to provide a disk or member with a plurality of concentric rows of pins which are adapted to mesh with the worm mounted upon a rotating shaft. The shaft is also capable of an oscillatory movement, so that the worm can pass from one row of pins to another, and it is necessary that the worm travel in the arc of a circle in its movement from one row of pins to another, so that there will be a meshing between the worm and the rows of pins.

The invention relates to still other novel features of construction and combinations of parts which will be hereinafter more fully described and pointed out in the claims.

In the accompanying drawings: Figure 1 is a top plan view of the invention; Fig. 2 is a view in side elevation; Fig. 3 is a top plan view of a slightly modified form; Fig. 4 is a view showing the disk or driven member in a reverse position and an edge elevation of another modified form; and Figs. 5 and 6 are detail sectional views showing the manner of mounting the pins or teeth upon the driven member.

A represents the driven member, which is in the form of a disk, and which is disclosed in Figs. 1 and 2 splined to a shaft 2 by a key 1.

Mounted upon the driven member or disk A are a plurality of concentric rows of pins or teeth 3, 3. The pins are preferably fastened to the disk by means of the shanks 4, 4 of the teeth passing through orifices in the disk and nuts 5 screwed upon the ends of the shanks for fastening the shanks and pins securely to the disk, this being clearly set forth in Fig. 5 of the drawing, and in Fig. 6 the pins are shown as being made integral with the disk. A power-driven shaft 6 has a beveled gear 7 mounted thereon, with which a beveled gear 8 meshes.

A shaft 9 is mounted upon the shaft 6 by means of a hanger 10, which permits of the shaft being oscillated at the will of the operator. The shaft 9 has the beveled gear 8 journaled on one end thereof, so that as the shaft 6 is rotated, rotary motion is transmitted to shaft 9 through beveled gears 7 and 8.

Mounted upon the shaft 9 is a worm gear 11. This gear has what is known as the V-shaped thread, so that it is capable of meshing with the pointed cone-shaped teeth or pins 3 on the disk or driven member A. The outermost row of pins represents the low-speed driving; the second row, the second speed; and the third or innermost row, high speed.

When the shaft 9 is oscillated on one side of the axis or center of the disk, so that the worm is brought into engagement with a row of pins, the disk or driven member will be driven in one direction, but when the shaft is turned to the other side of the center of the disk, and the worm brought into engagement with a row of pins, the disk will be caused to travel in a reverse direction. The worm can be brought to a neutral position at any time, either at the center of the disk, or between the various rows, and it is not necessary to stop the driven member or disk for the purpose of changing the speed, but of course when it is desired to reverse the direction of travel of the disk, it is necessary to bring the driven member to a stop before throwing the worm into gear with the teeth or pins on the opposite side of the disk.

The fact that the pins are made tapered and cone-shaped so that they terminate in a point and the worm on the shaft 9 is made with a V-shaped thread permits of the worm being shifted transversely of the disk in the arc of a circle for changing the speed of rotation of the disk without the necessity of raising the worm gear from one row of pins and inserting it into mesh with another row.

The travel of the worm gear in the arc of a circle permits it to be moved from engagement with one row of pins into engagement with another row of pins by simply moving the gear transversely and in the arc of a circle across the face of the driven member. The worm shaft may be rotated or it may be stationary during the oscillatory movement, and in either instance, the worm gear will always mesh with the concentric rows of pins, because the pins are made pointed, so that they will readily enter the groove of the worm.

In the modification shown in Fig. 3, the disk or member A is loosely mounted upon the shaft 2 and is provided with gear teeth 12 on the periphery thereof, which mesh with the teeth of the gear 13 of a shaft 14, whereby power will be transmitted to the shaft 14.

In the modification shown in Fig. 4, a beveled gear 15 is formed on the under side, and near the peripheral edge of the disk which meshes with the beveled gear 16 on a shaft 17.

From the foregoing it will be seen that I have provided a variable speed transmission gearing which is applicable for many uses, such as automobiles, lathes, traction engines, or any machine or apparatus wherein a variable speed is desired.

I claim:

1. The combination with a driven member, of a plurality of concentric rows of pointed teeth mounted on the driven member; a rotatable shaft and a worm mounted on the shaft having V-shaped threads adapted to mesh with the teeth on the driven member, said worm adapted to be moved transversely of said driven member causing the worm to be brought into mesh with the various rows of teeth for changing the speed of the driven member.

2. The combination with a driven member, of a plurality of concentric rows of pointed cone-shaped teeth, a rotatable and oscillating shaft, and a worm gear mounted on the said shaft having V-shaped threads adapted to mesh with the teeth on the driven member, said gear adapted to be moved transversely of the driven member and in the arc of a circle for causing the worm to be brought into mesh with the various rows of teeth for changing the speed of the driven member and for reversing the direction of travel of said member.

In testimony whereof I affix my signature, in the presence of two witnesses.

GEORGE ZINK.

Witnesses:
J. K. MOORE,
WATTS T. ESTABROOK.

Copies of this patent may be obtained for five cents each, by addressing the "Commissioner of Patents, Washington, D. C."